INVENTOR.
HENRY A. BLUMENFELD
FRANCIS P. PANDOLFI
CHIH-REE SUN

United States Patent Office 3,430,043
Patented Feb. 25, 1969

3,430,043
MINIMUM IONIZATION PARTICLE DE-
TECTOR PRODUCED BY GAMMA RAY
IRRADIATION
Henry A. Blumenfeld, Princeton, N.J., Francis P. Pandolfi,
Boston, Mass., and Chih-Ree Sun, Bayside, N.Y., as-
signors to the United States of America as represented
by the United States Atomic Energy Commission
Filed Oct. 8, 1965, Ser. No. 494,281
U.S. Cl. 250—83.3                                7 Claims
Int. Cl. H01j 39/00; G01t 1/16; H01l 7/46

ABSTRACT OF THE DISCLOSURE

Method of producing minimum ionizing charged par-
ticle detectors by irradiation in which the detector is
biased while the detector is being irradiated by gamma
rays. By measuring the rise in resistivity and determining
the irradiation dosage, a critical exposure level is de-
termined to produce peak resistivity for efficiently produc-
ing a homogeneous detector.

---

This invention relates generally to minimum ionization
particle detection and in particular to novel gamma ray
exposure method for the production of minimum ioniza-
tion particle detectors. The invention described herein
was made in the course of, or under, a contract with the
United States Atomic Energy Commission.

In experiments for hydrogen bubble chambers involv-
ing interactions between particles traveling at relativistic
velocities, a need exists for minimum ionization particle
detectors for controlling counters to select only certain
events for study whereby the amount of information which
is gathered in a short time does not by its shear bulk defy
analysis. These minimum ionization particles, as defined
in standard references, such as the "International Dic-
tionary of Physics and Electronics" published by Van
Nostrand in 1956, produce a broad dip bound on one side
by a rather sharp rise for decreasing particle energy, and
on the other side by a gradual rise for increasing particle
energy when the specific ionization produced along the
path of the charged particle in a medium is plotted as a
function of the particle energy. For singly charged par-
ticles in ordinary air, minimum ionization is about 50 ion
pairs per centimeter of path and in general is proportional
to the density of the medium and the square of the
charge of the particle. It occurs in air for particles having
velocities of 95% of the velocity of light, which corre-
sponds to a kinetic energy of 1 mev. for an electron, 2
bev. for a proton and 8 bev. for an $\alpha$-particle or helium
nucleus having two protons and two neutrons.

Various proposals have been made and used to ac-
complish such detection, comprising scintillation-photo-
multiplier detectors. While these arrangements are useful
and can accomplish the detection of minimum ionization
particles, they are bulky and must be shielded from the
high magnetic fields present around the bubble chambers
(e.g. fields of 18 kilogauss). Morevore, the detectors
known heretofore have not been able to detect certain
minimum ionizing particles, such as conversion electrons
at relativistic velocities produced in the bubble chamber
from $\gamma$-rays. It is additionally advantageous to provide a
matrix of detectors in the copper heat shield surrounding
the bubble chamber to provide detection with a high
degree of spatial resolution near the chamber itself.

It is an object of this invention, therefore, to provide
an economic and practical apparatus and method for the
detection of minimum ionization particles by providing
small solid-state detectors that can be used in high mag-
netic fields and at low temperatures;

It is a further object to provide a matrix of solid-state
particle detectors;

It is a further object to provide minimum ionization
particle detectors on the heat shield of a bubble chamber;

It is a further object to provide solid-state means for
detecting conversion electrons at relativistic velocities;

It is a further object to provide a solid-state charged
particle detector by irradiating pure n-type silicon with
$\gamma$-rays;

It is still a further object to determine the critical ex-
posure level, or optimum level of $\gamma$-ray exposure of solid-
state charged particle detectors by monitoring the resis-
tivity thereof.

The foregoing objects are achieved by irradiating discs
of pure silicon with $\gamma$-rays to provide a homogeneous
solid-state detector for minimum ionizing particles that
pass completely through the silicon. The method, com-
prises monitoring the resistivity of the disc at 298° K.
during irradiation to achieve the maximum resistivity and
minimum exposure. The detector produced thereby is
mounted for detecting minimum ionizing particles at 78°
K. in the heat shield of the 20 cps. rapid-cycle bubble
chamber at Princeton, New Jersey. This detector is highly
flexible and can be used for the detection of minimum
ionizing particles in a wide range of applications, bubble
chambers and conditions. In one embodiment, an n-type
silicon disc having a resistivity greater than 1000 ohm-cm.
and nickel film contacts on each side of the disc is ir-
radiated with $\gamma$-rays from a 7 kilocurie cobalt 60 source
while the disc resistivity is measured at 298° K., for rais-
ing the detector resistivity to a high level and for de-
termining the critical exposure level at which the detector
performance is at its maximum level.

The above and further objects and novel features of
this invention will appear more fully from the following
detailed description when the same is read in connection
with the accompanying drawings.

Figure 1:
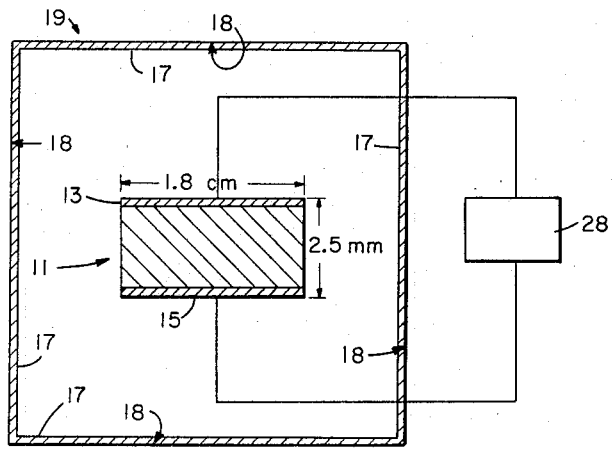
FIGURE 1 is a partial cross section of the minimum
ionization solid-state detector of this invention.

Referring now to FIGURE 1, detector disc 11 is formed
from an n (negative, electron donor) impurity free ingot
of silicon~1.8 cm. in diameter with a typical resistivity
of 1000 to 3000 ohm-cm. This resistivity is measured by
a two point probe and suitable material is supplied by
Dow Corning Corp., Englewood Cliffs, N.J., and Midland,
Michigan, and Merck and Company, Rahway, N.J. The
ingots are cut into 2.5 mm. thick wafers 11 and gross
damage caused by the diamond saw is removed by abrading
the surface of the prospective detector disc with 600 mesh
abrasive, such as silicon carbide. A suitable silicon carbide
is sold by the Carborundum Co. of Niagara Falls, N.Y.
In order to minimize the formation of a $SiO_2$ layer on
the freshly ground faces of the discs, a layer of several
A. thickness forming in air in less than one minute, the
disc is immediately boiled in trichloroethylene to degrease
the disc and then submerged in deionized water until
the contacts 13 and 15 are applied.

A very low work function metal down to ($\phi < 3.5$ e.v.),
such as Al or Au, is normally preferred for forming an
ohmic contact to high resistivity n-type silicon, but in accordance with this invention best results are obtained with nickel, which has a work function of $\phi=5.01$ e.v.

An electroless plating process is used to coat the nickel contact films 13 and 15 on disc 11. One advantageous plating solution is 30 gm./l. nickel chloride, 10 gm./l. sodium hypophosphate, 65 gm./l. ammonium citrate, 50 gm./l. ammonium chloride. Ammonium hydroxide ($NH_4OH$) is added to this solution at pH 8–10 and heated to boiling. The disc 11 is then placed in the boiling solution for securing thin nickel contact films 13 and 15 to the disc. The presence of free phosphorus as a decomposition impurity from the sodium hypophosphate is found to have a negligible effect in forming any rectifying p-n junction area across the face of the detector. Heating in the 100° C. plating solution is limited to three minutes in order to keep the nickel film thin and to prevent any change in the resistivity of the crystal. The desired contact areas on contact films 13 and 15 then masked with a suitable covering material and the unwanted nickel is dissolved by immersion of the disc in $HNO_3$. Suitable masking materials are wax or polystyrene dissolved in toluene. After the nickel films 13 and 15 are applied the resistivity of the coated disc 11 is measured by passing a current through the coated disc and observing the voltage drop. While the resistivity drops from the initial value due to carrier injection the diode effect observed upon current reversal amounts to 10% or less change in resistivity.

To raise the resistivity of the disc 11, defects are introduced into the crystal lattice by $\gamma$-ray bombardment; and thus indirectly by internal electron bombardment. The low level crystal lattice defect production in this process necessitates using a starting material of 1000 ohm-cm. or greater resistivity to achieve the desired results. Also, this process has to be completed with as low an exposure to the $\gamma$-rays as possible to prevent an excessive number of trapping centers being formed, because the effect of such traps is to lower pulse height and to slow pulse rise time.

Exposure of the plated silicon discs 11 is carried out in $Co^{60}$ box-shaped cell 19. One suitable cell is the 7 kilocurie $Co^{60}$ cell at the Bell Telephone Laboratories in Murray Hill, N.J. Each disc is treated on an individual basis since it is not possible to achieve the same resistivity changes in all discs for equal irradiation dosages even if the discs are initially cut as adjacent slices from the same ingot. This is due to the fact that the manufacture of such high resistivity material is not a stable process, the carrier impurity being concentrated to a low level of a few parts per billion such that significant variations in resistivity readily occur. Typically, after an irradiation at 25° C. to an exposure of $1.5 \times 10^7$ roentgens, the silicon resistivity is raised to $4.0 \times 10^6$ ohms-cm. at 78° K.

Figure 2:
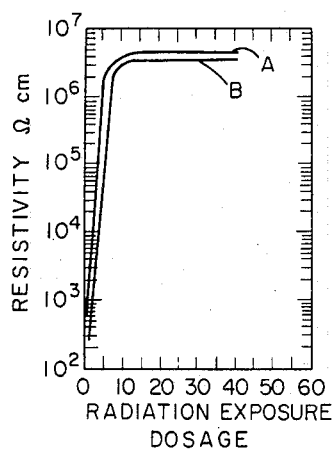
FIGURE 2 is a schematic representation of resistivity
in $\Omega$ cm. vs. $\gamma$-ray radiation exposure in roentgens$\times 10^6$
for two different samples of n-type silicon detectors with
Ni contacts at 10 v. bias and 78° K.
Figure 3:
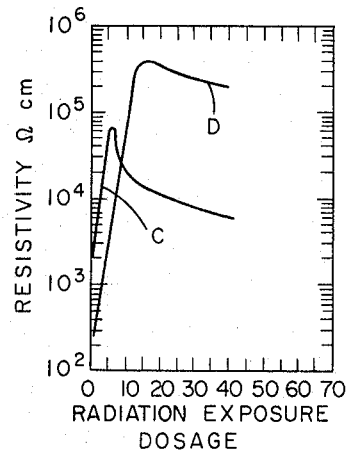
FIGURE 3 is a schematic representation of resistivity
in $\Omega$ cm. vs. $\gamma$-ray exposure in roentgens$\times 10^6$ for two
different samples of N-type silicon detectors with Ni con-
tacts at 1.5 v. bias and 298° K.

In understanding how this invention achieves the lowest possible $\gamma$-ray dosage capable of raising the resistivity sufficiently to produce a detector meeting the desired requirements, reference is made to FIG. 2. This graph represents the results of irradiating two different samples of the N-type silicon discs 11 with nickel contacts 13 and 15 biased at 10 v. from source 28. These tests showed good detector performance upon irradiations to between $5 \times 10^6$ roentgens and $15 \times 10^6$ roentgens. Continued irradiation decreased detector performance. These tests comprised a first cycle wherein the samples were irradiated to a dosage of $5.0 \times 10^5$ roentgens, the resistivity was measured at 78° K., the detector was tested for detector performance and this cycle was repeated with the next exposure depending upon the results of the performance test. Thus if the disc didn't function as a detector, another exposure dosage was given. As noted above the detector performance reached an optimum and then dropped off with further $\gamma$-ray bombardment. This was because a specific critical irradiation produced the optimum detector performance by producing uniform homogeneously placed defects whereby the whole detector disc 11 was uniformly homogeneously close to its intrinsic level. Thereupon continued irradiation above the critical amount produced trapping centers that adversely affected the detector performance. This critical irradiation was difficult to determine, however, and necessitated testing the detector performance after each small irradiation, since the resistivity of the detector leveled off after the critical irradiation exposure level was achieved. Minimum ionizing particle detection performance was achieved with sample 1, illustrated by curve A, at from about $2.5 \times 10^6$ to $3.5 \times 10^6$ ohms-cm. resistivity and only after $5 \times 10^6$ roentgens irradiation. Minimum ionizing particle detection was achieved with sample 2, illustrated by curve B, at from about $3.8 \times 10^6$ ohms-cm. resistivity after $15 \times 10^6$ roentgens irradiation to about $4 \times 10^6$ ohms-cm. resistivity after about $40 \times 10^6$ roentgens irradiation While the resistivity measured at 78° K. does not indicate any decrease in the detector resistivity beyond its optimum $\gamma$-irradiation, in accordance with this invention, the resistivity measurements at 298° K. and low bias does indeed produce a decrease in resistivity and indicates a critical exposure level, hereinafter referred to as C.E.L. As shown in FIG. 3, for example, the resistivity of coated discs 11 exhibits a peak resistivity vs. radiation curve when the disc resistivity is at $7 \times 10^6$ ohms-cm. Thus by intermittently monitoring the resistivity of the coated disc 11 at 298° K. and at 1.5 v. bias from source 28 during the bombardment from a $\gamma$-ray source 17 on the 6 walls 18 of cell 19 (four of which are shown for ease of explanation) an efficient, homogeneous detector is produced having an exact, easily determinable C.E.L. at the point where the maximum resistivity is achieved between a rise and fall in the resistivity due to the irradiation. Moreover, the homogeneous high resistivity silicon wafer detectors of this invention are stable and unaffected by high magnetic fields or low temperatures or exposure to the air at room temperature for periods of the order of one year, and the surface preparation is simple and inexpensive. Additionally, the dark current and trapping centers are kept to a minimum by raising the resistivity to between $4 \times 10^4$ and $4 \times 10^5$ ohms-cm. at 298° K. with an irradiation between $5 \times 10^6$ and $15 \times 10^6$ roentgens. This high or minimum resistivity is required because the minimum in the $dE/d\zeta$ versus E behaviour of the minimum ionizing charged particles in the relativistic region produces a $dE/d\zeta$ value in passing completely through silicon of only 1.7 mev. $cm.^2$ gm. Also, the energy loss is only about 4.1 mev. $cm.^{-1}$ and the resultant signals from detectors 2.5 mm. thick are in the millivolt range.

In these tests at 298° K. minimum ionizing detection was achieved in sample 3, illustrated by curve C, at $7 \times 10^4$ ohms-cm. after an irradiation dosage of $5 \times 10^6$ roentgens was reached. No detection was achieved up to this critical level of $7 \times 10^4$ ohms-cm. or before this irradiation level. In sample 4, illustrated by curve D, minimum ionization detection was achieved only after a resistivity of $4 \times 10^5$ ohms-cm. was reached at an irradiation dosage of $15 \times 10^5$ roentgens. Also, these tests indicated that detection performance continued good through a finite resistivity drop from the C.E.L. point, e.g. to $4 \times 10^4$ ohms-cm. for curve C and $2 \times 10^5$ ohms-cm. for curve D.

Testing the response of the detectors to minimum ionizing particles is accomplished in a housing evacuated to $\sim 0.1 \mu$ Hg and cooled to 78° K. by liquid nitrogen. The beam of incoming particles passes through a window, such as a uniform thin aluminized Mylar window ¼ inch in diameter placed in the chamber immediately above the detector. In two actual distinct tests a 500 microcurie $Sr^{90}-Y^{90}$ having a beta emitter of 2.25 mev. maximum energy was used to test the detector response characteristics. Also, the response to cosmic rays was observed by placing the detector in coincidence with scintillators. This device comprised two small sections of scintillators, one above and one below the detector which if triggered in coincidence with the detector, gated a pulse from the detector.

Figure 4:
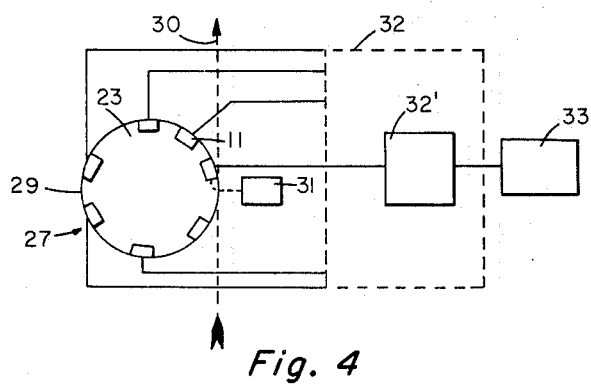
FIGURE 4 is a partial cross-section of an annular
matrix of solid-state detectors around the heat shield of a
bubble chamber.

The counters operated at a bias of 1600 v./cm. from a suitable source 31 shown in FIG. 4. The detector pulses were detected with a signal to noise ratio greater than 10 and to this end a charge sensitive amplifier 32 was used having its transfer function standardized by injecting known current pulses thus to establish the input charge to output voltage relationship. One suitable amplifier is the charge sensitive amplifier described in Brookhaven National Laboratory Report No. 5014, by Chase, Higinbotham and Miller entitled "Amplifiers for Use With p-n Junction Radiation Detectors."

These tests showed the average charge accumulation to be of the order of $6.0 \times 10^{-14}$ coulombs. The observed pulse rise times from the detector were from 50–150 nsec. However, the actual bubble chamber experiments were limited to the use of detectors having a pulse rise time of 50 nsec. or less.

The results of both the beta and cosmic ray tests were alike. The cosmic ray test was performed so that the bombarding particles were truly minimum-ionizing.

In operation charged particles enter bubble chamber 23 (shown in FIG. 4) to produce minimum ionizing particles that completely pass through Ni coated, irradiated, solid-state detector discs 11, which are mounted in an annular arrayed matrix 27 around the bubble chamber 23 in the copper heat shield 29 of the chamber 23 at about 78° K. in an 18 kilogauss magnetic field 30. A suitable bias of 1600 v./cm., is supplied by a suitable source 31. When ionizing particles traverse the whole detector charges are produced which are swept out by the applied field bias to produce the required pulse. Upon passing completely through the detector disc 11 these minimum ionizing particles, such as conversion electrons from $\gamma$-rays produced in chamber 23, produce millivolt pulses with a pulse rise time in the detector less than about 150 nsec. and a signal to noise ratio greater than 10. The pulses pass through nickel contacts 13 and 15 to suitable amplifier 32, having individual amplifiers 32' for the respective detectors 11, and this amplifier amplifies this pulse for use by a suitable counter control mechanism 33, which selects predetermined or certain events for study. The average charge accumulated in the amplifier 32 per pulse was of the order of $6.0 \times 10^{-4}$ coulombs. The amplifier bias was adjusted to prevent the superimposition of long pulses on the desired short pulses.

The homogeneous charged particle solid-state detector of this invention has the advantage of providing detection of relativistic minimum ionizing particles passing completely through the detector. This detector is easily efficiently and practically produced by bombarding pure silicon with $\gamma$-rays to produce a homogeneous high resisitivity charged particle detector. Even $\mu$-mesons and conversion electrons can be detected thereby. To this end, the optimum dose corresponds to a minimum irradiation and maximum resistivity at 298° K. and is achieved by suitable monitoring during irradiation. This is shown by comparing the resistivity curves as a function of $\gamma$-ray dosage at 78° K. and 298° K. Moreover, actual tests have shown that the detector of this invention is operable at 78° K. in 18 kilogauss magnetic fields and can be left at room temperature and atmospheric conditions for periods of at least 6 months without suffering any appreciable deterioration in particle detection ability.

What is claimed is:

1. A silicon particle detector for relativistic, minimum ionizing particles passing completely through a body of silicon, comprising a thin $\gamma$-irradiated silicon disc having flat opposite sides, homogeneous substantially uniform crystal lattice defects, a resistivity of at least $7 \times 10^4$ ohms-cm. at 298° K. and 15 v. bias, and thin nickel contact films on the opposite flat surfaces of said disc.

2. A minimum ionizing charged particle detector for conversion electrons, comprising an annular matrix of $\gamma$-irradiated, nickel coated, silicon charged particle detectors having a support, comprising a heat shield at 78° K. and a chamber containing liquid hydrogen at a pressure of about $0.1\mu$ inches of Hg in said shield at about 18 kilogauss for receiving incoming particles to produce said minimum ionizing charged particles.

3. The method of producing a minimum ionizing charged particle detector, comprising diamond cutting 1.8 cm. diameter, pure n-type silicon ingots, having a resistivity of 1000 to 3000 ohms-cm. into 2.5 mm. thick flat sided wafers, removing cutting damage by abrading the wafer sides with 600 mesh silicon carbide, minimizing the formation of $SiO_2$ layers on the disc by boiling the abraded discs in trichloroethylene and submerging in deionized water, applying thin-nickel coats to the flat sides of the disc by boiling for three minutes in a solution of 30 gm./l. nickel chloride, 10 gm./l. sodium hypophosphate, 65 gm./l. ammonium citrate and 50 gm./l. ammonium chloride to which ammonium hydroxide is added at pH 8–10 whereby the resistivity due to carrier injection is less than about 10%, bombarding said disc from a 7 kilocurie $Co^{60}$ source with $\gamma$-rays that produce internal compton electron bombardment whereby uniform, homogeneously located crystal lattice defects are produced throughout said coated wafer and said wafer resistivity is raised to a maximum level, and monitoring the resistivity of said coated wafer during said irradiation at a bias of 1.5 volts and a temperature of 298° K. whereby said wafer can be removed from said $\gamma$-ray bombardment at its critical exposure level which corresponds to its maximum resistivity level, minimum $\gamma$-ray dosage level and a low trapping center level, said detector thus producing an average charge accumulation of $6 \times 10^{-14}$ coulombs with a pulse rise time of less than 150 nsec. in response to the passage of minimum ionizing charged particles completely therethrough.

4. A method of producing a minimum ionizing charged particle detector, comprising coating a flat sided 1000–3000 ohms-cm. resistivity 2.5 mm. thick silicon disc with thin nickel contact films on the flat sides of the disc and irradiating the coated sides with low gamma ray dosage between $5.0 \times 10^6$ and $15.0 \times 10^6$ roentgens to produce a resistivity between $4 \times 10^4$ and $4 \times 10^5$ ohms-cm. in said disc and homogeneous crystal lattice defects.

5. The invention of claim 4 in which said coated disc is irradiated while the resistivity of said disc is monitored at 298° K. for determining the increase to a maximum resistivity in said disc, whereby maximum resistivity is produced with minimum irradiation.

6. The invention of claim 4 in which said dosage is supplied by a 7 kilocurie $Co^{60}$ source.

7. The invention of claim 4 in which said silicon disc is boiled for three minutes in a nickel plating solution, consisting of a 30 gm./l. nickel chloride, 10 gm./l. sodium hypophosphate, 65 gm./l. ammonium citrate and 50 gm./l. ammonium chloride to which ammonium hydroxide is added at pH 8–10.

No references cited.

RALPH G. NILSON, *Primary Examiner.*

S. ELBAUM, *Assistant Examiner.*

U. S. Cl. X.R.

29—585; 148—182; 204—154